United States Patent [19]

Camilleri

[11] Patent Number: 4,662,808
[45] Date of Patent: May 5, 1987

[54] WALL ANCHOR
[75] Inventor: Charles F. Camilleri, St. Louis, Mo.
[73] Assignee: Lee-Rowan Company, St. Louis, Mo.
[21] Appl. No.: 783,163
[22] Filed: Oct. 2, 1985
[51] Int. Cl.$^4$ ............................................. F16B 13/04
[52] U.S. Cl. .................................... 411/340; 411/394
[58] Field of Search ............................... 411/340–346, 411/29, 16, 18, 57–61, 71, 72, 394

[56] References Cited
U.S. PATENT DOCUMENTS

| 2,033,100 | 3/1936 | Kellogg | 411/72 |
| 2,555,420 | 6/1951 | Richardson | 411/72 |
| 3,188,905 | 6/1965 | Millet | 411/57 |
| 3,213,745 | 10/1965 | Dwyer | 411/15 |
| 3,431,813 | 3/1969 | Johnson | 411/71 |
| 4,022,100 | 5/1977 | Johnson | 411/57 |
| 4,274,324 | 6/1981 | Giannuzzi | 411/29 |

FOREIGN PATENT DOCUMENTS 4919 of 1893 United Kingdom ................ 411/394
1226 of 1910 United Kingdom ................ 411/394

Primary Examiner—James L. Ridgill, Jr.
Attorney, Agent, or Firm—Rogers, Howell, Moore & Haferkamp

[57] ABSTRACT

A wall anchor having a socket and a drive pin. A passage within the socket receives the drive pin. Fingers on the leading end of the socket have walls in the path of the pin. The fingers pivot into contact with the back surface of the wall by a cam action of the drive pin against the fingers and slightly spaced from a web in front of the fingers. Ribs on the inner wall of the passage grip the drive pin in a ready position. A head on the socket and barbs on the outer wall hold the socket in another part. The fingers have generally flat faces that are barbed to make maximum contact with the wall surface. The drive pin has a shank at its lead portion and helical threads at its trailing portion with a head on the trailing end. The drive pin can be driven by a hammer through the socket and can be withdrawn by the use of a screwdriver.

23 Claims, 8 Drawing Figures

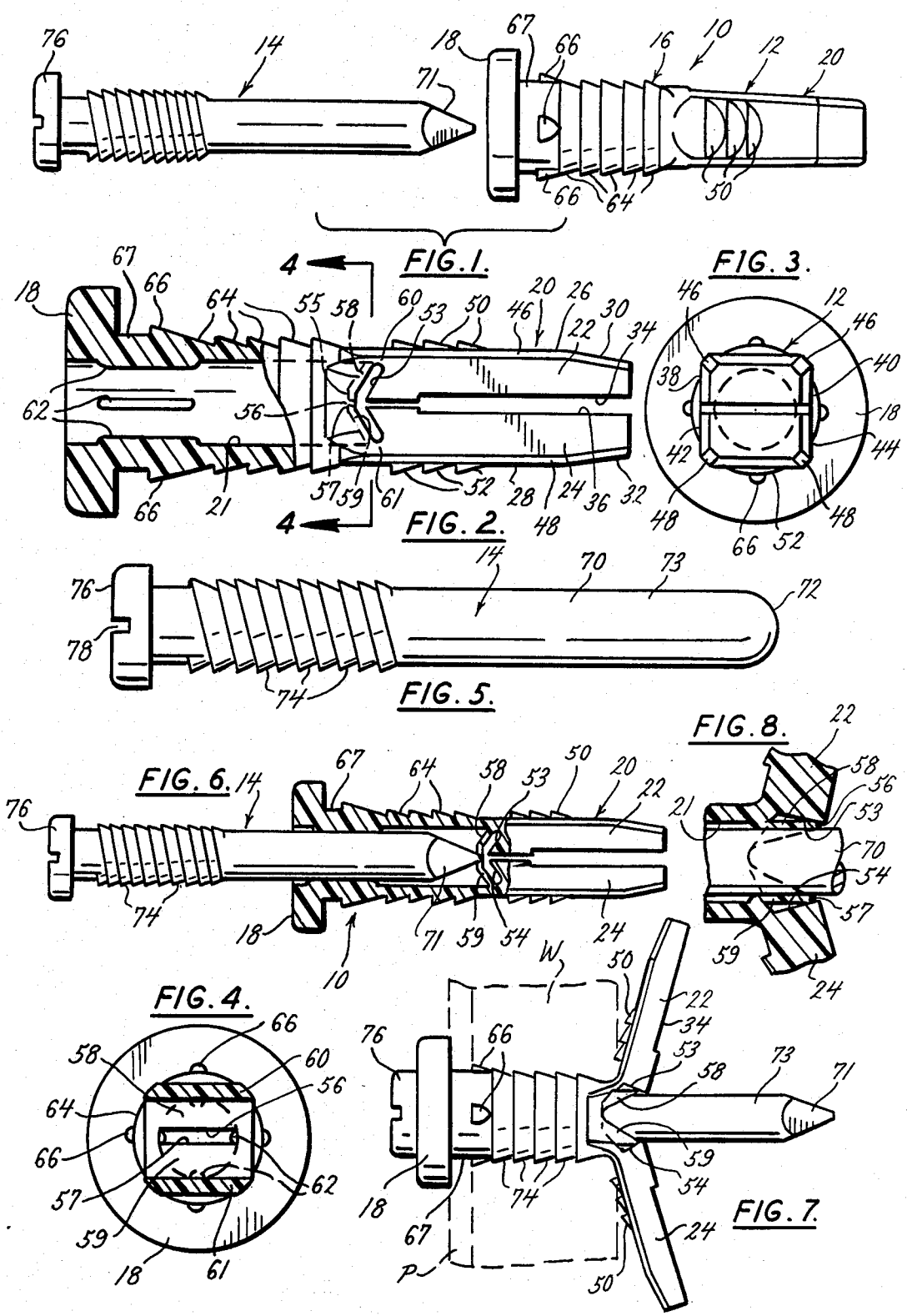

WALL ANCHOR

BACKGROUND AND SUMMARY OF THE INVENTION

This invention relates to a wall anchor and particularly to a wall anchor comprising a socket having a body portion with fingers integrally hinged thereto and also comprising a drive pin that can be driven into the socket to spread the fingers by a camming action. The invention further relates to a wall anchor that can attach a part to a wall and that incorporates means to retain the wall anchor on the part prior to attachment to the wall.

Various wall anchors, including those with laterally expandable fingers, have been devised. These earlier wall anchors have been made of various materials, including plastic. However, there are unique features of this invention, which include a socket that is a unitary molded plastic member having a head on one end, a body section in the center, and fingers hinged at the other end, outwardly projecting barbs spaced from the head, with a passage through the head and body communicating with the fingers, wherein the fingers have transverse walls in the path of the passage, combined with a pin that can be driven by a hammer through the passage into contact with the transverse walls to act as a cam and pivot the fingers laterally outwardly.

The transverse walls are preferably inclined inwardly and toward the head of the socket so that the pin will pivot the fingers as far outwardly as possible toward ninety degree projections relative to the axis of the passage.

A special feature of this invention is the provision of a web slightly spaced from the transverse walls. There is a small opening through the web, such as a slit. Without the web, a stress line would be formed during molding, the end of the core forming the passage where that core intersects the transverse walls. By providing the web, the location of the stress line is moved to the intersection of the core and the web, and the walls joining the web and the transverse walls can be formed rounded with no stress lines. This avoids failure at the pivot lines of the fingers that might result from stress lines.

The web performs another function. As the drive pin is driven through the passage, it first contacts the web and, because the slit is parallel to the pivot lines of the fingers, the pin will split the web and pivot its halves toward the fingers. Thereafter, when the pin cams the fingers outwardly, the web halves lie against the pin and present edges opposing a tendency of the transverse walls to slide back along the pin. A particular advantage in the present wall anchor is that it is molded with the fingers positioned together. Therefore, it is not necessary to squeeze the fingers together to insert the socket into a pre-drilled hole in a wall.

Additional features of this wall anchor which are distinctive include longitudinal ribs on the inner wall of the passage to grip the shank of the drive pin, barbs on the outer wall of the shank, adjacent the head thereof, to snap the socket within a hole provided in another part that is to be secured to a wall surface, a head on the socket that acts as a positive stop against the wall surface or against the part, sawtooth rings on the outer body surface of the socket to frictionally engage a hole in a wall, and ridges on the outer surfaces of the fingers that frictionally engage the wall when the fingers are laterally extended. These ridges are on generally flat outer faces of the fingers which therefore maintain maximum contact area with the wall surface when the fingers are spread and laterally extended. However, the outer longitudinal corners of the fingers are chamfered to keep the fingers within the general overall diameter of the socket, and within the overall diameter of a hole in the wall into which the socket is to be mounted. The leading end of each finger is tapered to facilitate introduction of the socket into the hole in the wall.

In addition to these important features of the socket, the pin is also distinct in that it comprises a lead section that is generally like a nail. This lead section is normally held within the ribbed portion of the passage in the socket in a ready position. The trailing end of the drive pin has a head on it with a kerf in it that is sized to receive a screwdriver, or a phillips head slot, and adjacent the head, the drive pin preferably has threads that are typically in a double helix. The threads have a sawtooth contour so that the drive pin can be driven in the direction of its lead end but will respond to a screwdriver when rotated in a counter clockwise direction to withdraw the pin from the socket.

The drive pin may have a sharp point on its lead end, as a nail point, or it may be rather blunt, or semi-spherical. The semi-spherical point functions well to avoid the aforesaid wedging between the fingers, cooperating with the inclined transverse walls to produce the desired camming action. If a point is used, is should be driveable into a wood stud, but not too sharp to jam between the fingers and avoid the camming action.

On the other hand, an advantage of the pointed drive pin is that, if the anchor is placed in a predrilled hole in a stud that restrains the fingers from pivoting laterally, the sharp point will lead the pin into a wedging position between the fingers and wedge them tightly against the side walls of such a hole. In such a use, the edges of the outer surfaces of the fingers are particularly effective in holding the anchor in place, and the sawtooth configuration of these ridges is an additional aid in the effectiveness of the grip.

The invention provides an inexpensive wall anchor in that the socket is a single piece and can be readily produced by molding plastic. The camming action between the drive pin and the transverse walls on the fingers produces maximum spread of the fingers and results in a stronger installation on the wall. The barbs spaced from the head allow the socket to be snapped in place and held in the hole of a part that is to be mounted on the wall. The longitudinal ribs hold the drive pin in the socket but withdrawn from the fingers so the socket can be pushed into a hole in the wall.

DETAILED DESCRIPTION OF THE DRAWINGS

FIG. 1 is a top plan view of the wall anchor comprising the socket and a pointed drive pin;

FIG. 2 is a side elevation view of the socket with portions shown in longitudinal medial section;

FIG. 3 is a front elevation view of the lead end of the socket;

FIG. 4 is a view in section taken along the line 4—4 of FIG. 2;

FIG. 5 is a side elevation view of another embodiment of the drive pin;

FIG. 6 is a side elevation view similar to that of FIG. 2 but showing the drive pin in the socket in a ready position;

FIG. 7 is a side elevation view of the socket and drive pin showing the drive pin fully inserted in the socket with the fingers extended by the cam action of the drive pin; and FIG. 8 is an enlarged view in medial section of the central portion of the socket showing the web with the pin driven through it.

DETAILED DESCRIPTION OF THE PREFERRED EMBODIMENT

As shown in FIG. 1, the principal components of this wall anchor 10 include a socket 12 and a drive pin 14. The socket 12 receives the drive pin 14 in a manner and for purposes which will be described hereinafter.

The socket 12 includes a body section 16, a head 18, and a finger section 20. There is a passage 21 through the head 18 and the body section 16 communicating with the finger section 20. The finger section 20 includes two fingers 22 and 24 having flat outer surfaces 26 and 28, respectively, terminating in tapered nose sections 30 and 32 at the lead end of the socket 12. Inwardly, the fingers 22 and 24 have opposed flat faces 34 and 36, and the finger 22 has side walls 38 and 40, the other finger 24 having side walls 42 and 44. Preferably, the longitudinal corners 46 of the finger 22 and the corners 48 of the finger 24 are chamfered as shown in FIG. 3. Toward their trailing ends, the fingers 22 and 24 have barbs 50 and 52, respectively, that are sawtooth in side elevation as shown in FIG. 2.

The fingers 22 and 24 are formed with transverse walls 53 and 54 that extend across the lead end of the passage 21. Preferably, these walls 53 and 54 are inclined inwardly and toward the head 18 at angles of about 60° of the axis of the passage 21. Spaced from the walls 53 and 54, a web 55 is formed integral with the socket 12. A slit across the width of the web parallel to the faces 34 and 36 has opposed edges 56 and 57. The slit separates the web into halves 58 and 59 which, as shown in FIG. 2, are generally parallel to the walls 53 and 54.

Although the intersection of the passage 21 and the web may have a stress line, the short sections 60 and 61 can be unstressed and even rounded as shown in FIGS. 2 and 6. These short sections 60 and 61 are molded as integral parts of the plastic socket 12 and are of generally the same thickness as that of the wall of the central portion 16 of the socket. Since these sections 60 and 61 are relatively thin, they can bend and act as hinge connections between the fingers 22 and 24, respectively, and the body section 16. In the molded condition, the fingers 22 and 24 are straight and together in the positions shown in FIGS. 2 and 6, held there by the internal memory of the plastic hinges 60 and 61, until forcefully expanded.

Referring to the central body section 16, a plurality of longitudinally extending ribs 62 project inwardly on the inner wall of the passage 21. The primary purpose of these ribs 62 is to grip the shank of the drive pin 14 as shown in FIG. 6, holding the pin 14 in a ready condition. In other words, the circumscribed diameter defined by the ribs 62 is slightly less than the diameter of the shank of the drive pin 14.

On the outer surface of the central section 16, there are a plurality of rings 64 that are generally sawtooth in side elevation. The outer diameters of the rings 64 are essentially the same as the span between the barbs 50 and 52 so that both the fingers 22 and 24 and the central portion 16 of the socket 12 will fit in the same size hole in a wall.

Between the rings 64 and the head 18, there are a plurality of barbs 66 on the central section 16. A span 67 of the socket 12 between the barbs 66 and the head 18 is about as long as the thickness of a part P that is to be mounted to a wall W. These barbs 66 define a circumscribed circle, the diameter of which is greater than that of the rings 64. The function of the barbs 66 is to engage one side of a part P while the head 18 engages the other side to thereby retain the socket 18 within a hole in the part prior to installation on a wall.

In its preferred form, as shown in FIG. 1, the drive pin 14 has a shank 70 with a point 71 on its lead end. In a modification as shown in FIG. 5, the drive pin 14 has a blunter point 72, which may be semi-spherical. Generally, the lead section 73 of the shank 70 is cylindrical like a nail, whereas the trailing section is formed with double helix threads 74. The double helix threads 74 are sawtooth in side elevation, as shown in FIG. 5, with the leading faces of the threads at an angle of about 15° to the axis of the drive pin. This enables the drive pin to be driven, such as by a hammer, into the socket with minimal interference from the threads 74. On the other hand, since the trailing edges of the threads 74 are preferably normal to the axis of the pin, the threads 74 will grip the inner wall of the passage 22 to withdraw the drive pin when it is turned by a screwdriver. For both driving and withdrawing the drive pin 14, there is a head 76 on the trailing end of the drive pin 14 with a screwdriver kerf 78, or phillips slot, in it. The diameter of the leading cylindrical section 73 is about equal to the internal diameter of the passage 21, but is greater than the diameter circumscribed by the ribs 62. Therefore, when the drive pin 14 is started into the passage 22 and pressed within the longitudinal ribs 62, the ribs 62 will grip the pin 14 and hold it in place. Because the socket 12 is plastic, it will yield, and the pin can be inserted manually.

Operation and Use

If the wall anchor is to be used to mount a part P to a wall W, it will have been molded with the span 67 between the head 18 and the barbs 66 slightly greater than the thickness of the part P. The part P will have been provided with a hole through it, the diameter of which is about equal to the outer diameter of the span 67, but less than the circumscribed diameter of the barbs 66. When the socket 12 is pressed into such a hole, the barbs 66 will yield and the socket can be snapped into place with the head 18 on one side of the part P, and the barbs 66 on the other side, thereby retaining the socket 12 on the part.

The drive pin 14 is pressed into the passage 21 until the leading portion 73 of the shank 70 is pressed within the area of the ribs 62. These ribs 62 will hold the drive pin 14 in place. Another step is to drill a hole in a wall W, the diameter of which is slightly greater than the diameter of the body of the socket 12, and less than the diameter of the rings 64. The socket 12 can then be pushed into the hole in the wall W, and the rings 64 will hold it in place temporarily. Now, a hammer can drive against the head 76 of the drive pin 14. As the drive pin 14 projects further into the socket 12, it presses against the web 55, deflecting the web sections 58 and 59 toward the finger section 20. Thereafter, the pin 14 engages the transverse faces 54 and 56 of the fingers 22 and 24 and pivots the fingers toward the ninety degree orientations shown in FIG. 7. As illustrated in FIG. 8, the web halves 58 and 59 are now stretched along the pin shank 70, placing their edges 56 and 57 in positions to help hold the fingers 22 and 24 in their spread positions. The barbs 50 and 52 grip the wall surface as shown in FIG. 7.

When it is desired to remove the wall anchor, the kerf, or phillips slot, 78 in the drive pin allows it to be rotated by a screwdriver in a direction that will cause the double helical threads 74 to withdraw the drive pin from the socket 12. Once the drive pin has cleared the faces 54 and 56 of the fingers 22 and 24, they can pivot back to the straight positions shown in FIG. 2, and the wall anchor can be withdrawn from the hole in the wall.

There are various changes and modifications which may be made to this invention as would be apparent to those skilled in the art. However, any of these changes or modifications are included in the teaching of this disclosure and this invention is limited only by the scope of the claims appended hereto.

What is claimed is:

1. A wall anchor comprising a molded plastic socket and a pin, the socket comprising a body section having a lead end and a trailing end, a passage through the body section for receiving the pin, a pair of elongated fingers integral with the body section and extending from the lead end of the body section, the fingers having thin wall portions joining them to the body section, the thin wall portions being bendable to act as hinges allowing the fingers to swing between normally closed positions in which the outer extremes of the fingers allow the fingers to fit within a predetermined hole in a building wall and spread positions in which the fingers are pivoted laterally outwardly relative to the body section and will not fit through the hole, the fingers being sufficiently long to enable them to be pivoted by a person's fingers, the socket being molded to position the fingers in the normally closed positions to allow the socket to be inserted into the hole in the wall without requiring an external force squeezing the fingers together, the fingers having transverse walls extending across transverse portions of the passage in the path of the pin whereby projection of the pin beyond the leading end of the body section presses the lead end of the pin against the transverse walls of the fingers in a cam action to pivot the fingers to the spread positions, and a plurality of radially inwardly extending longitudinal ribs on the wall of the passage to grip the pin, the ribs being shaped to maintain pressure in a radial direction against the pin upon insertion and extension of the pin in the passage whereby the socket will support and retain the pin prior to installation of the wall anchor, the combination of the ribs retaining the pin and the fingers normally occupying closed positions enabling the wall anchor including the socket and the pin to be inserted in the hole in the wall by one hand.

2. The wall anchor of claim 1 wherein the body section has a generally round cross-section and the fingers are generally rectangular in cross section with flat outer faces to contact the building wall and with chamfered longitudinal outer corners to enable the fingers to pass through the hole.

3. The wall anchor of claim 2 wherein the fingers have tapered leading ends to facilitate introduction into the predetermined hole.

4. The wall anchor of claim 1 including a plurality of axially spaced rings on the outer surface of the body section adjacent the trailing end thereof.

5. The wall anchor of claim 4 including a head on the trailing end of the body section, the passage extending through the head, a plurality of barbs on the outer surface of the body section equally spaced from the head and located between the head and the rings, the circumscribed diameter of the barbs being less than the diameter of the head and being greater than the diameter of the body section.

6. The wall anchor of claim 5 wherein each barb is defined by a leading face at an angle of less than about 30° to the axis of the socket, and a trailing face at an angle of greater than 60° to the axis of the socket.

7. The wall anchor of claim 1 wherein the transverse walls of the fingers are inclined toward the body section, the pin comprising a shank having a leading end and a trailing end, the leading end terminating generally in a hemisphere to assure contact with the transverse walls and avoid jamming between the fingers, a head on the trailing end allowing it to be driven into the socket, and threads on at least a portion of the shank.

8. The wall anchor of claim 7 including slot means in the head for receiving a screwdriver.

9. The wall anchor of claim 7 wherein the threads are helical and have leading and trailing faces, the leading faces being at angles of less than 45° to the axis of the shank and the trailing faces being at angles of greater than 45° to the axis of the shank.

10. The wall anchor of claim 9 wherein the threads are on about one-half the shank adjacent the trailing end thereof and the remainder of the shank adjacent the leading end thereof is cylindrical.

11. A wall anchor comprising a pin and socket wherein the socket includes a body section with a leading end and a trailing end, a pair of fingers hinged to the trailing end and being pivotable relative to the body section, an annular wall surface defining a passage through the body section for receiving the pin, the fingers having transverse walls extending inwardly from the annular inner wall surface in the path of the pin and cooperable with the pin for pivoting the fingers to laterally extending positions, and a web in the passage between the walls of the fingers and the trailing end, the web being independent of the fingers and joined to the socket and extending inwardly from the inner wall surface for interception by the pin before the pin reaches the transverse walls.

12. The wall anchor of claim 11 including a slit in the web enabling the pin to split the web into two halves pressed against the transverse walls.

13. The wall anchor of claim 11 wherein the web is spaced from the walls of the fingers.

14. The wall anchor of claim 11 including a plurality of ribs formed on the body section projecting axially inwardly of the passage wall, the diameter of the pin being greater than the diameter circumscribed by the inward extensions of the ribs and being less than the diameter of the passage whereby the pin can be manually pressed into the passage and held there by the ribs, the pin having a leading end and a trailing end, a point on the leading end, a generally cylindrical shank portion adjacent the point and terminating intermediate the leading end and the trailing end and being longer than the ribs, and helical threads between the cylindrical shank portion and the trailing end, the maximum diameter of the threads being greater than the diameter of the passage.

15. The wall anchor of claim 14 wherein the threads are defined by leading surfaces at less than 45° to the axis of the pin and trailing surfaces at greater than 45° to the axis of the pin, a head on the trailing end of the pin to facilitate driving the pin with a hammer, and a kerf in the head to receive a screwdriver.

16. The wall anchor of claim 15 wherein the trailing surfaces are at about 90° to the axis of the pin.

17. The wall anchor of claim 11 wherein the walls of the fingers are inclined inwardly and toward the trailing end.

18. The wall anchor of claim 17 wherein the angle of inclination is between about 55 degrees and about 65 degrees to the axis of the passage.

19. The wall anchor of claim 17 wherein the web has portions generally parallel to the walls of the fingers.

20. A wall anchor for mounting a part to a wall wherein the part has a hole in it for receiving the wall anchor, comprising a pin and a plastic socket, the socket having a body section and a finger section, a passage through the body section for receiving the pin, the finger section comprising a pair of fingers, short bendable sections for connecting the respective fingers to a first end of the body section and allowing them to pivot about the body section, the fingers having walls in the path of the passage to pivot the fingers laterally relative to the body section upon engagement between the walls and the pin, a head on a second end of the body section, a retainer means projecting outwardly from and located circumferentially about the body section, the retainer means being spaced from the head and cooperating with the head to define a circumferential retainer section therebetween, the diameter of the retainer section being smaller than the diameter of the hole in the part, the diameter of the head and the circumscribed diameter of the retainer means being greater than the diameter of the hole in the part, whereby the socket can be snapped within the hole in the part and the part can be held in place within the retainer section by the head on one side of the part and the retainer means on the other side of the part.

21. The wall anchor of claim 20 wherein the fingers have flat outer faces and outer longitudinal edges that are chamfered, enabling the fingers to fit through the hole while maximizing contact area between the fingers and the wall when the anchor is mounting the part to the wall.

22. The wall anchor of claim 20 wherein the retainer means comprises a plurality of barbs, each barb having a first surface facing the first end of the body section and a second surface facing the second end of the body section, the first surface being at an angle of less than about 25° to the axis of the body section, the second surface being at an angle of greater than 75° to the axis of the body section.

23. The wall anchor of claim 22 wherein the second surface is at an angle of at least 85° to the axis of the body section.

* * * * *